(12) United States Patent
Motakef

(10) Patent No.: US 9,446,342 B2
(45) Date of Patent: Sep. 20, 2016

(54) CYCLONE INDUCED SWEEPING FLOW SEPARATOR

(76) Inventor: Abbas Motakef, Johns Creek, GA (US)

(*) Notice: Subject to any disclaimer, the term of this patent is extended or adjusted under 35 U.S.C. 154(b) by 824 days.

(21) Appl. No.: 13/374,812

(22) Filed: Jan. 17, 2012

(65) Prior Publication Data

US 2012/0168361 A1 Jul. 5, 2012

(51) Int. Cl.
*B01D 45/16* (2006.01)
*B01D 50/00* (2006.01)
*B01D 46/00* (2006.01)
*B01D 46/40* (2006.01)

(52) U.S. Cl.
CPC ............ *B01D 50/002* (2013.01); *B01D 45/16* (2013.01); *B01D 46/0046* (2013.01); *B01D 46/40* (2013.01)

(58) Field of Classification Search
CPC  B01D 46/0046; B01D 46/40; B01D 50/002; B01D 45/16; B01D 21/267; B01D 2201/02
USPC ....... 210/137, 314, 299, 346, 315, 297, 787, 210/788, 304, 784, 499, 747.5, 747.6; 55/317, 324
See application file for complete search history.

(56) References Cited

U.S. PATENT DOCUMENTS 5,791,495 A * 8/1998 Gero et al. ................. 209/395
8,887,925 B2 * 11/2014 Motakef ..................... 210/499
2004/0084385 A1 * 5/2004 Arnaud ....................... 210/788

* cited by examiner

*Primary Examiner* — Madeline Gonzalez

(57) ABSTRACT

The cylindrical or conical shaped particle separator operates based on cyclone-induced flow sweeping the face of the cylindrical separator screen, creating inertial separation of suspended particles. The separator screen comprises of multitude of parallel, evenly spaced, asymmetrically profiled, linear, screen elements arranged in a cylindrical or conical grid-like shape parallel with the axis of the cylinder or cone. The cyclone effect is created by the rotational, helical path of the fluid inside or outside of the cylindrical or conical separator screen. The spinning, rotating fluid sweeps the inner or outer side of the stationary or rotating screen, passing approximately perpendicularly over the linear grid-like elements and gaps between the elements. The screen elements may be wires, bars, narrow strips, airfoil vanes or other similar linear elements with a flow separation edge on the trailing end of the profile of the element.

6 Claims, 7 Drawing Sheets

CYCLONE INDUCED SWEEPING FLOW SEPARATOR

TECHNICAL FIELD

The present application relates generally to inertial separation of particulates suspended in or carried by fluids and specifically to, air filters, dust separators, clarifiers, cyclones, vacuum cleaners, precipitators, sifting screens, decanters, demisters, gaseous and fluid filtration devices alike.

BACKGROUND OF THE INVENTION

Separation of suspended particulates from fluids is a common filtration engineering task. Solid, semi-solid or gel-like particulates may be suspended or carried in a gases or liquids in motion. Small water droplets, spray-mist, sea salt, dust etc, may be suspended in the ambient air, carried by wind or blown by ventilation systems. Fly ash and unburned coal dust may be exhausted in the hot fumes of industrial boilers and combustors. Intakes of water treatment systems, desalination systems may have sand and suspended silt in the raw water. Wastewater and storm water may also carry large quantities of suspended solids. Various chemical, petrochemical and pharmaceutical processes may have liquids that have suspended bubbles of insoluble liquids (emulsion droplets) or small blobs of coagulated matter mixed in with the carrying liquid. The present application has a solution for the problem of efficient separation of such particles and droplets from fluids by means of inertial separation. In inertial separation technologies, local acceleration is used to induce inertial forces to the suspended particles required for separation. The concentration of particles is low or close to zero in the filtrate stream and high in the concentrate stream. The efficiency of separation is commonly expressed as the ratio of particle concentration in filtrate stream over the particle concentration in the feed stream. There are several known inertial separation technologies. Demister vanes, marine vane separators, inertial spin or swirl tubes, tuyere separators, centrifuges, variety of cyclones, etc.

Cyclone separation technology is widely used for removal of particulate matter from fluids without the use of filters. Cyclones are devices that create high speed rotating flow—or spinning field of fluid—in a cylindrical and conical vessel by inducing the fluid tangentially to the circumference of the cylinder. Centrifugal force and gravity are used to separate mixtures of solids and fluids. Air flows in a spiral pattern, beginning at the top (wide end) of the cyclone and ending at the bottom (narrow) end before exiting the cyclone in a straight stream through the center of the cyclone and out at the top. Larger and denser particles in the rotating stream have too much inertia to follow the curvature of the stream and strike the outside wall, falling then to the bottom of the cyclone where they can be removed. In a conical system, as the rotating flow moves towards the narrow end of the cyclone the radius of the stream curvature is reduced, separating smaller and smaller particles. Larger particles will be removed with a greater efficiency and smaller particles with a lower efficiency. The disadvantage of the currently known cyclone technology is that it has limited minimum streamline curvature (i.e. how small the curvature can be). The streamline curvature is largely defined by the radius of the cylindrical portion of the cyclone. As smaller curvature generally results in better separation efficiency, therefore the current cyclone technology has limited efficiency because the curvature of the cyclone is limited to the radius of its cylinder. The present application has improved separation efficiency over the current cyclones.

Various separation screens are also widely used in the field of liquid and gas filtration. There are several known inertial separator technologies such as demister vanes, marine vane separators, tuyere separators, water intake screens, etc. Few of these recently developed separator systems employ sweeping flow to facilitate and improve the separation of suspended matter. The sweeping flow is tangential to the surface of the separator while the pass-through flow is perpendicular to the surface. These recently introduced sweeping flow technologies utilize wedge wire screens for inertial separation, such as described in US20100224570. Wedge shaped wire screens are preferred for their low-maintenance operation.

The present application is the continuation of the inertial separation concept described in the Patent Application titled "Wedge Bar for Inertial Separation" U.S. Ser. No. 12/924,003 Asymmetrical separators elements are utilized, promoting small curvature accelerated flow across the linear gaps of the screen—separated from the flow sweeping the face side of the screen.

SUMMARY OF THE INVENTION

The present application describes a particle separator based on a cyclone induced sweeping flow. This cylindrical or conical shaped separator screen operates based on inertial separation of suspended particles in fluids. The separator screen comprises of multitude of parallel, evenly spaced, asymmetrically profiled, linear elements arranged in a cylindrical or conical shape parallel with the axis of the cylinder or cone. In one embodiment, the fluid mixed with particulates enters tangentially at the top end of the cylinder or cone through a high velocity jet. The cyclone effect is created by the rotational, helical path of the fluid inside of the cylindrical or conical separator screen. The spinning, rotating fluid sweeps the inner side of the separator, passing approximately perpendicularly over the linear elements and gaps between the elements. Part of the fluid will pass through the gaps of the separator to a collector-space that is an outer space, approximately coaxial with the separator-screen. The streamlines of the fluid passing through the gaps of the separator have sharp curvatures creating the acceleration conditions required for inertial separation of particulates. The particulates even those that are smaller than the openings of the separator screen—separate from the streamlines of the pass-through flow and continue on the helical path inside the cylinder. The pass-through fluid is clean while the rotating vortex flow inside the separator-screen is concentrated with particles. The spiraling flow sweeps the particles along the inner portion of the separator-screen and they are collected at the bottom cone and released from the cyclone. The separated, clean fluid leaves the cyclone from the coaxial collector space. The separator-screen elements may be wires, bars, narrow strips, blades, airfoils or other similar linear elements with a flow separation edge on the trailing end of the profile of the element. The separation edge facilitates a formation of sharply curved streamlines of the flow passing through the gaps of the separator-screen for high acceleration and effective inertial separation of particles. The protruding separation edge also facilitates a formation of gently curved un-separated sweeping streamlines that provide bridge effect, taking the particles over the gaps of the separator.

In another embodiment, the fluid mixed with particulates enters tangentially at the top end of the cylindrical vessel into the coaxial space between the inertial separator screen and the wall of the cylinder vessel. The cyclone effect is created by the rotational, helical path of the fluid imposed by wall of the cylinder vessel. The rotating fluid sweeps the outer side of the separator screen, passing over the linear elements. Part of the fluid will pass through the gaps of the separator to the central collector-space that is inside the separator-screen. The sharply curved streamlines of the fluid passing through the gaps of the separator-screen have the acceleration conditions required for inertial separation of particles. The particles—even though some are smaller than the screen openings—separate from the streamlines of the pass-through flow and continue on the helical path in the coaxial space outside the separator. The pass-through fluid is clean while the rotating vortex flow outside the separator screen is concentrated with particles. The spiraling cyclone-flow sweeps the particles along the outer portion of the separator-screen and they are collected at the bottom cone and released from the cyclone. The separated, clean fluid leaves the cyclone from the central collector space through an outlet pipe and port, located in the centerline of the apparatus.

In another embodiment, the inertial separation screen is a rotating (non-stationary) component of the system. The separation screen is rotating around of its cylindrical axis, in counter direction of the rotation of the tangentially entered mixed-fluid. The counter directional rotation enhances the inertial separation effect of the system. The fluid mixed with particulates enters tangentially at the top end of the cylindrical vessel into the coaxial space between the rotating inertial separator screen and the wall of the cylinder vessel. The rotating fluid sweeps the outer side of the rotating separator screen, passing over the linear elements that are moving in counter direction. Part of the fluid will pass through the gaps of the separator to the central collector-space that is inside the separator-screen. The particles separate from the streamlines of the pass-through flow and continue on the helical path in the coaxial space outside the separator. The pass-through fluid is clean while the rotating vortex flow outside the separator screen is concentrated with particles. The spiraling cyclone-flow sweeps the particles along the outer portion of the separator-screen and they are collected at the bottom cone and released from the cyclone. The separated, clean fluid leaves the cyclone from the central collector space through an outlet pipe and port, located in the centerline of the apparatus.

These and other features of the present application will become apparent to one of ordinary skill in the art upon review of the following detailed description when taken in conjunction with the several drawings and the appended claims.

DETAILED DESCRIPTION

Figure 1:
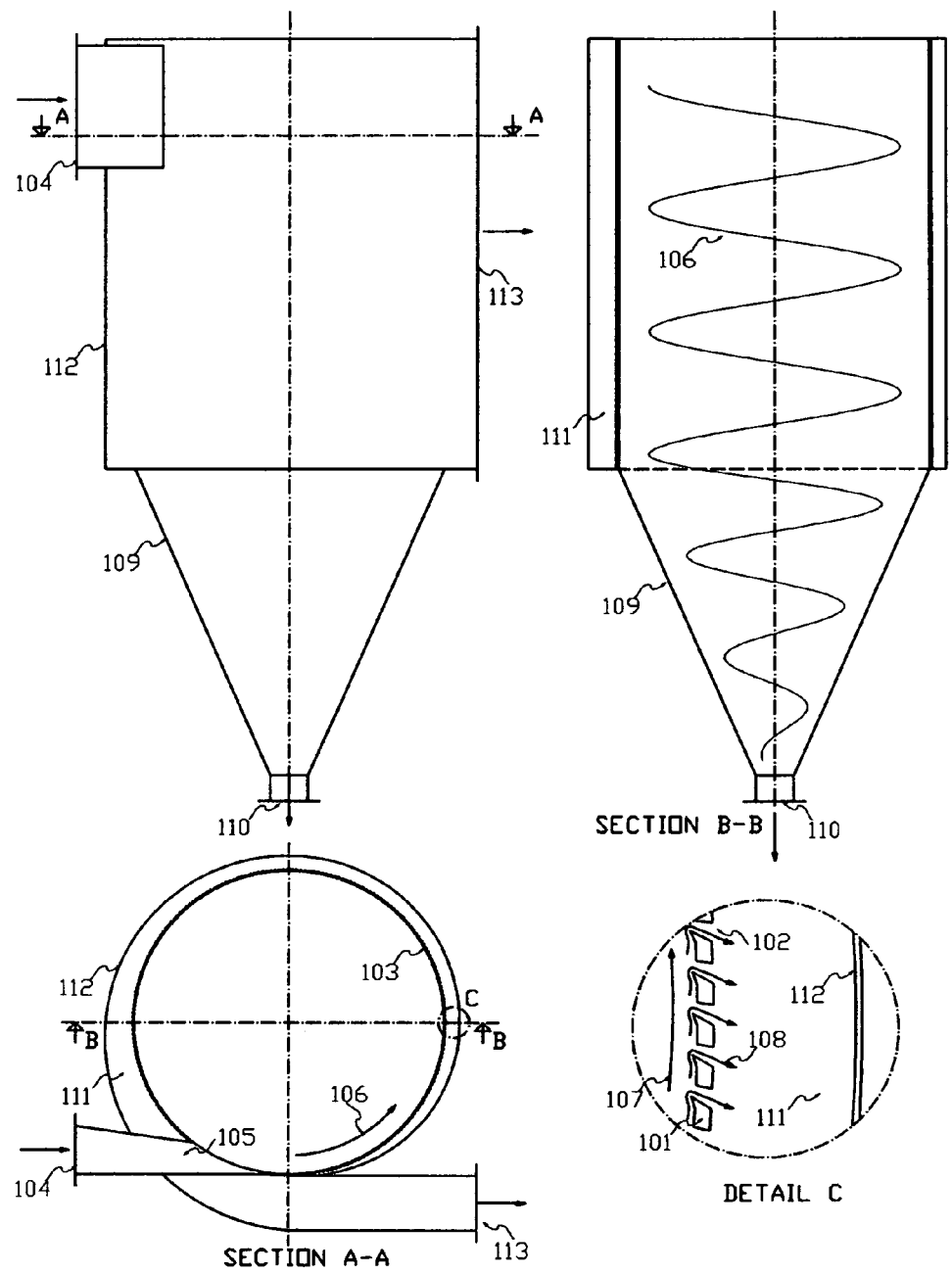
FIG. 1 shows one preferred embodiment of the cyclone induced sweeping flow separator. This embodiment is primarily for low pressure fluids. It has a single stage sweeping flow separator screen. The mixed fluid enters to the cyclone tangentially; the clean fluid leaves tangentially through a volute shaped collector space, while the separated particles are removed from the bottom.

Referring now to the drawings, in which like numerals indicate like elements, FIG. 1 shows cross sectional views and details of one preferred embodiment of the cyclone induced sweeping flow separator screen. Multitude of parallel, asymmetrically profiled linear elements 101 are evenly spaced, separated by gaps 102 to form the linear grid of the cylindrical or slightly conical face of the separator-screen 103. The mixed flow of fluid (gas or liquid) and particles enters the apparatus through the inlet port 104 at the top portion of the device. The inlet nozzle 105 accelerates and directs the flow tangentially to the face of the screen. This tangential entry generates a spinning, rotating, swirling motion of the fluid 106 inside the separator-screen that is also referred as cyclone effect. The rotating fluid sweeps the cylindrical face of the screen perpendicularly crossing 107 its linear grid elements 101. Some of the fluid will pass through the gaps of the separator screen, with sharply curved streamlines 108 around the edges of the grid elements. The inertia of the particles in the mixed fluid will separate them from the curved streamlines of the fluid 108 passing through the separator screen and they will remain inside of the screen swept along the rotating cyclone flow 106—even if they are smaller than the screen gaps. The sweeping cyclone flow and the gravity will carry the particles to the bottom portion of the device. The particles will collect in the bottom, cone shaped space 109 and are removed through the outlet port 110. The separated fluid passed through the separator screen and enters in the clean-fluid collector space 111. The clean fluid collector space is spiral shaped volute 112 formed around the separator screen. The volute has an outlet port 113 for the clean fluid.

Figure 2:
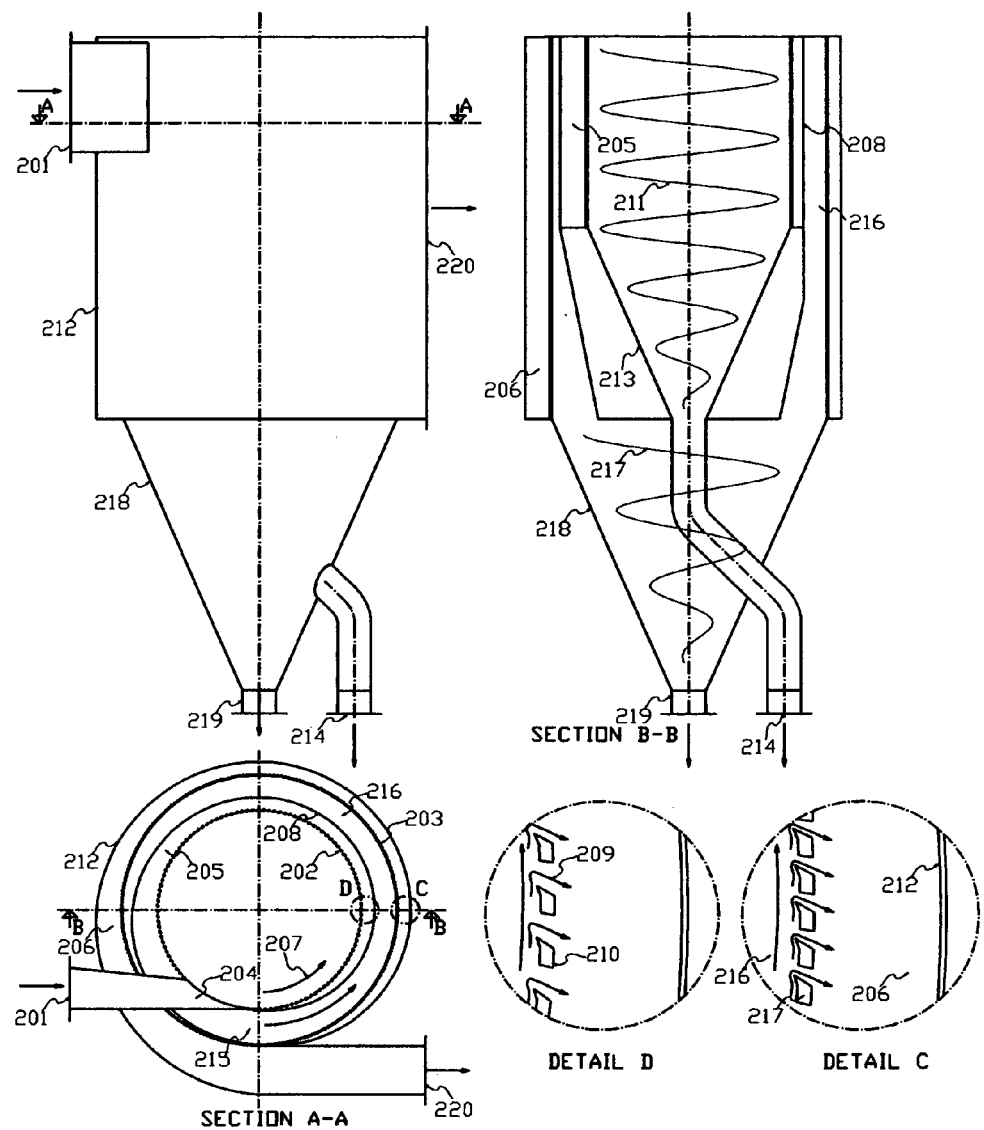
FIG. 2 shows a two-stage sweeping flow separator screen. Two sweeping flow separators are installed in series in a single cyclone. The apparatus cleans the inlet fluid and separates the particulate matter into coarser and finer particles. The mixed fluid enters into the cyclone tangentially at the top and the clean fluid leaves tangentially through a volute collector space. The coarser and finer particles are removed from two solid outlets at the bottom of the cyclone.

FIG. 2 generally depicts the principle of operation of multi-stage sweeping flow separator screen and specifically one preferred embodiment of a two-stage sweeping flow separator screen. The multi-stage apparatus cleans the inlet fluid from particulates and separates the particulate matter into multitude of coarser to finer particles bins. The description of operation of the two stage separator shown on FIG. 2 is as follows: The coarser flow separator 202 is embedded inside of the second finer flow separator 203. They are connected in series as the fluid flows through the inner separator 202 first and the outer separator 203 second. The separator screens are mounted in the same cyclone-housing 212. The fluid mixed with particles enters into the cyclone tangentially at the top through the inlet port 201 and is accelerated through the inlet nozzle 204. The fluid is forced to a spinning rotational flow 207 along the inner, cylindrical wall of the coarser screen. This rotational-flow pattern is also referred to as cyclone effect. Asymmetrically profiled, vertically oriented linear elements 210 form the wall of the cylinder of the screen. The multitude of parallel, evenly spaced, linear elements separated by gaps form the linear grid of the cylindrical face of the separator screen. The rotational spinning flow sweeps across the screen-grid elements perpendicular to their longitudinal axis. Some of the fluid passes through the gaps of the separation screen 209. The streamlines of the passing fluid are sharply curved. The larger, high-velocity particles are separated from the screened flow by their inertia and swept along, inside the cylinder of the separator screen. The particles pulled by gravity, travel on a helical path 211 down to the bottom inner collector cone 213 and are removed through a coarse-particle outlet port 214. The fluid passed through the coarse inner screen is collected in a volute space 205 and guided by a spiral shaped wall 208, through a tangential nozzle into the outer separator screen 216. The outer screen is finer in that the linear screen-bar elements have a smaller pass-through gap. The mechanism of inertial separation of finer particulates in the outer screen is similar to the inner screen described above. The particles travel on a helical path 217 inside of the 216 downwards into the fine collector cone 218 and are removed through the fine particle outlet port 219. The cleaned flow that passed the second stage separator-screen is collected in a spiral volute 206—shaped by spirally formed outer wall 212 and leaves the device through the clean fluid outlet port 220.

Figure 3:
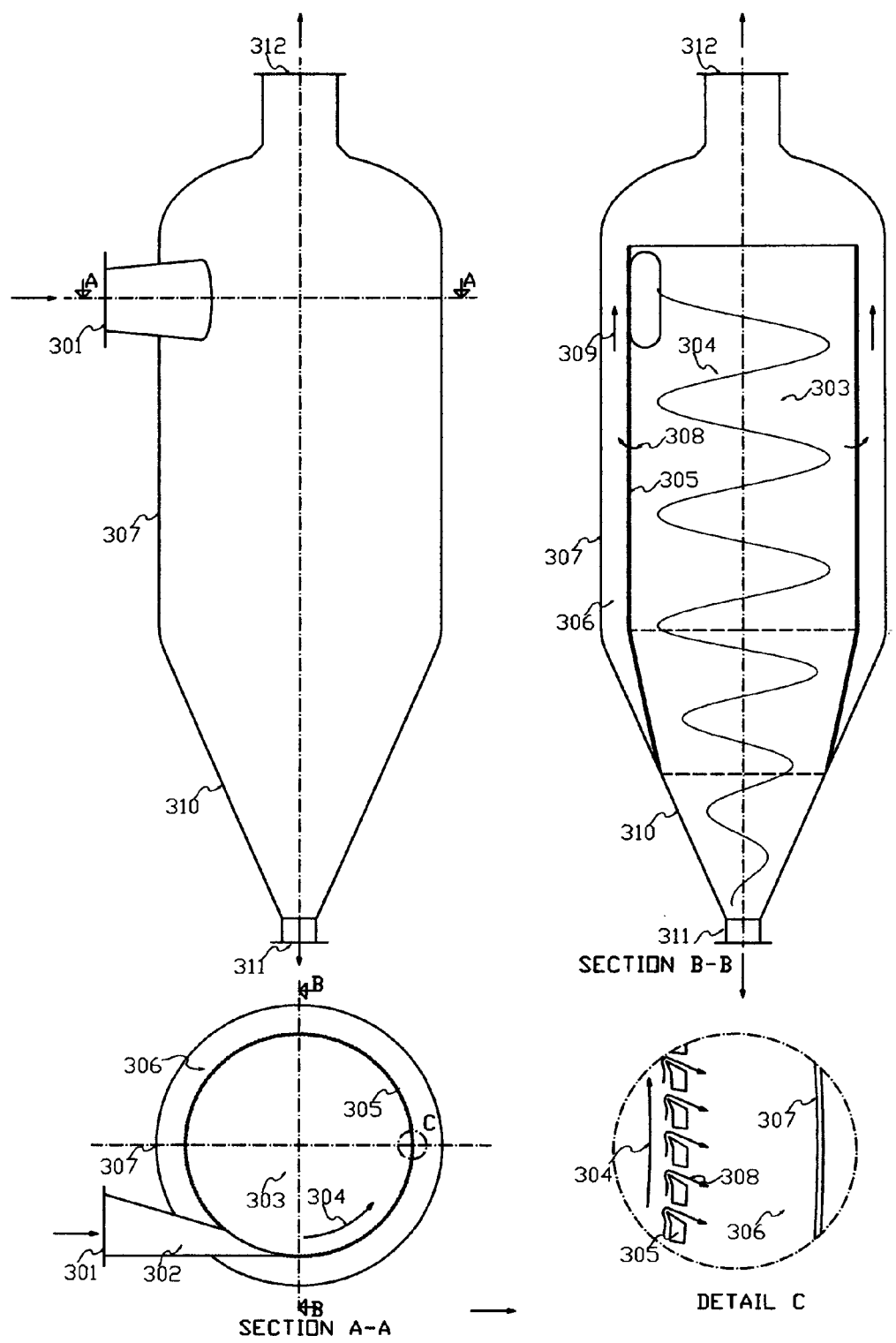
FIG. 3 depicts another embodiment of the cyclone separator-screen. It is a single stage, high pressure device, where the inlet port and the two outlet ports are arranged conventionally as in the known cyclones. The mixed fluid tangentially enters the upper portion of the cyclone and creates a sweeping vortex flow along the internal surface of the cylindrical screen. The clean fluid passed through the separator-screen is collected in the outer, cylindrical portion of the vessel and leaves the system through the port at the top center. The concentrate with separated particles leaves at the bottom center.

FIG. 3 presents another preferred embodiment of the cyclone separator-screen. The depicted device is a single stage separator, constructed for high pressures. The mixed fluid enters through the inlet port 301 and is accelerated through a converging nozzle 302. The fluid jet enters tangentially into the vertically oriented, cylindrical or slightly conical cyclone 303. The fluid is forced in a rotational helical downward path 304. The fluid sweeps perpendicularly over the linear elements of the separator-screen 305. Some of the fluid passes through the gaps of the screen forced on sharply curved streamlines 308. The inertial forces acting on the particles separate them from the pass-through flow and they continue to be swept along the rotational path inside the cylinder of the separator-screen. The particles gradually fall down to the bottom collector cone 310 and are removed through the particulate outlet port 311. The cleaned flow passed through the separator-screen, is collected in the cylindrical outer sleeve 306 and it flows upward 309 to the outlet port 312 located on the top of the system. Despite the similar external geometry, the embodiment presented on FIG. 3 is substantially different than the known conventional cyclone separators because the applied principle of inertial separation: The present application utilizes the inertial separation forces on a small scale due to the sharply curved streamlines around the asymmetric profile of the linear screen grid elements. The rotational cyclone flow is only induced to maintain the sweeping flow over the cylindrical separator-screen. The known conventional cyclones use the inertial forces on the macro scale as the curvature of the streamlines are determined by the radius of the cylinder of the cyclone. In comparison the radius of curvature of the streamlines of the present application is smaller by several orders of magnitude compared to the radius of curvature of streamlines of known cyclone technologies.

Figure 4:
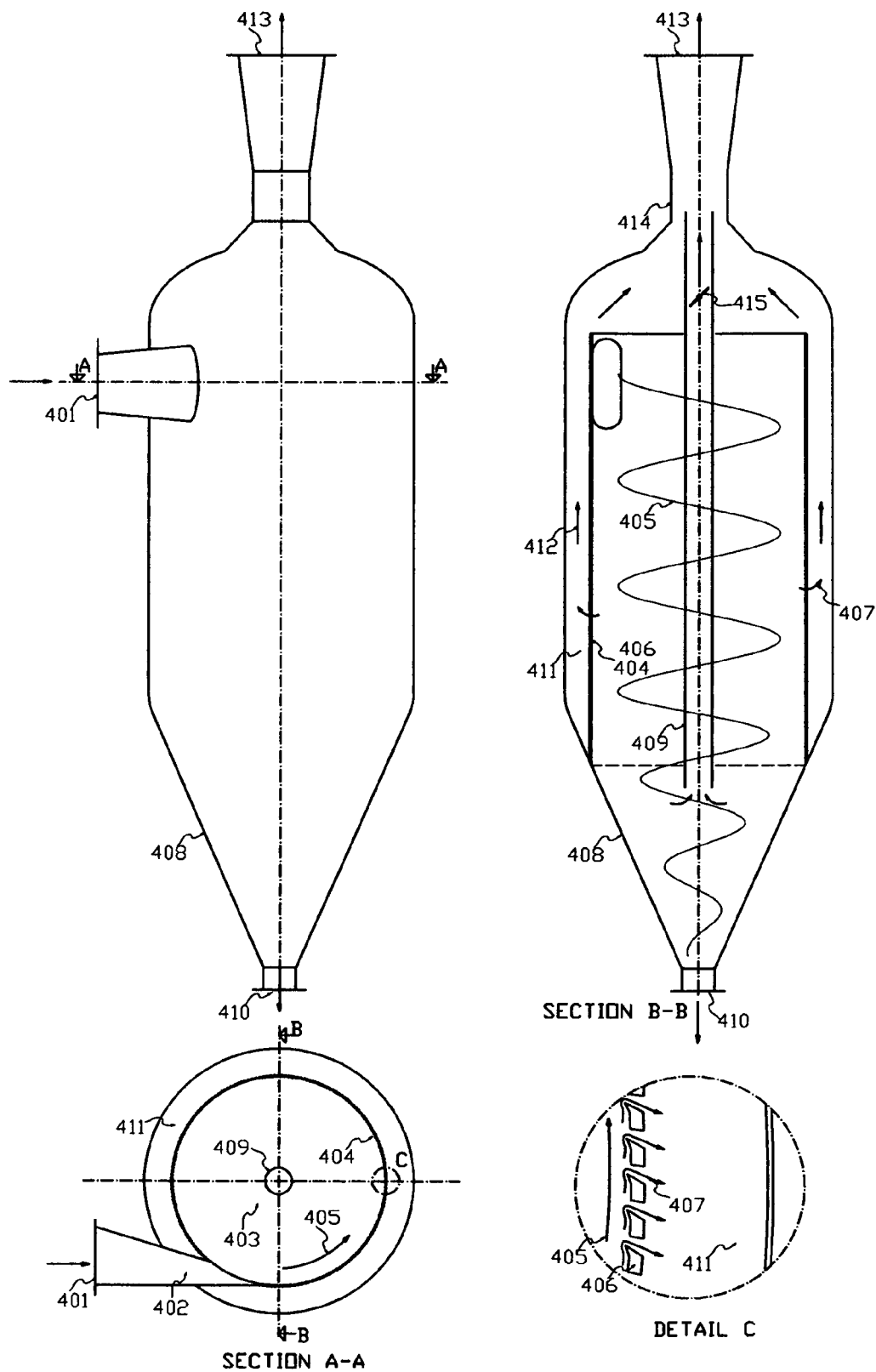
FIG. 4 illustrates another embodiment of the cyclone induced sweeping flow separator screen. This apparatus is an integrated system with conventional cyclone action as well as sweeping flow separator action. The clean fluid is collected from the cylindrical outer portion as well as through the central collector tube from the bottom portion of the cyclone. The ratios of the flows from these two sources are balanced through a balancing valve and an ejector located in the upper extraction port.

FIG. 4 depicts another embodiment of the cyclone induced sweeping flow separator screen. This device is an integrated system with conventional cyclone action combined with sweeping flow separation-screen action. The mixed fluid enters the device through the inlet port 401 and is accelerated to a jet through a converging nozzle 402. The jet enters tangentially into the cylindrical cyclone 403 of the separation screen 404 described in the previous paragraphs of this application. The fluid is forced to a helical downward path 405. The fluid sweeps perpendicularly over the linear elements of the screen 404. Portion of the fluid passes through the separation screen on sharply curved streamlines 407. Inertial forces separate the particles from the pass-through flow and are swept along inside the cylinder of the screen. The cleaned flow passed through the separation-screen, is collected in the cylindrical outer sleeve 411 and it flows upward 412 to the outlet port 413 located on the top of the apparatus. The particles are carried down to the bottom portion of the cyclone toward the collector cone 408. The following portion of the process is a conventional cyclone separation effect of the known technologies. In the converging cone the angular (rotational) speed of the spinning fluid increases—such that the inertial momentum of the fluid can be preserved. The increased rotational speed results in an increased centrifugal force. The particles are concentrated near the wall of the cone by centrifugal forces. The clean fluid is removed through the collector tube located at the center of the bottom portion of the cyclone 409. The particles—separated by the combined inertial screen and conventional cyclone effect—are collected at the bottom of the cone and removed through the particulate outlet port 410. There are two streams of clean fluid: one collected in the outer sleeve 412, the other through the central collector tube 409. The two streams are combined through an ejector 414 located in the outlet port 413. The ratios of the flows from these two sources are balanced through a balancing valve 415 and an ejector 414. The balancing valve also serves as a control device that may influence the efficiency of the separation for variable particle sizes.

Figure 5:
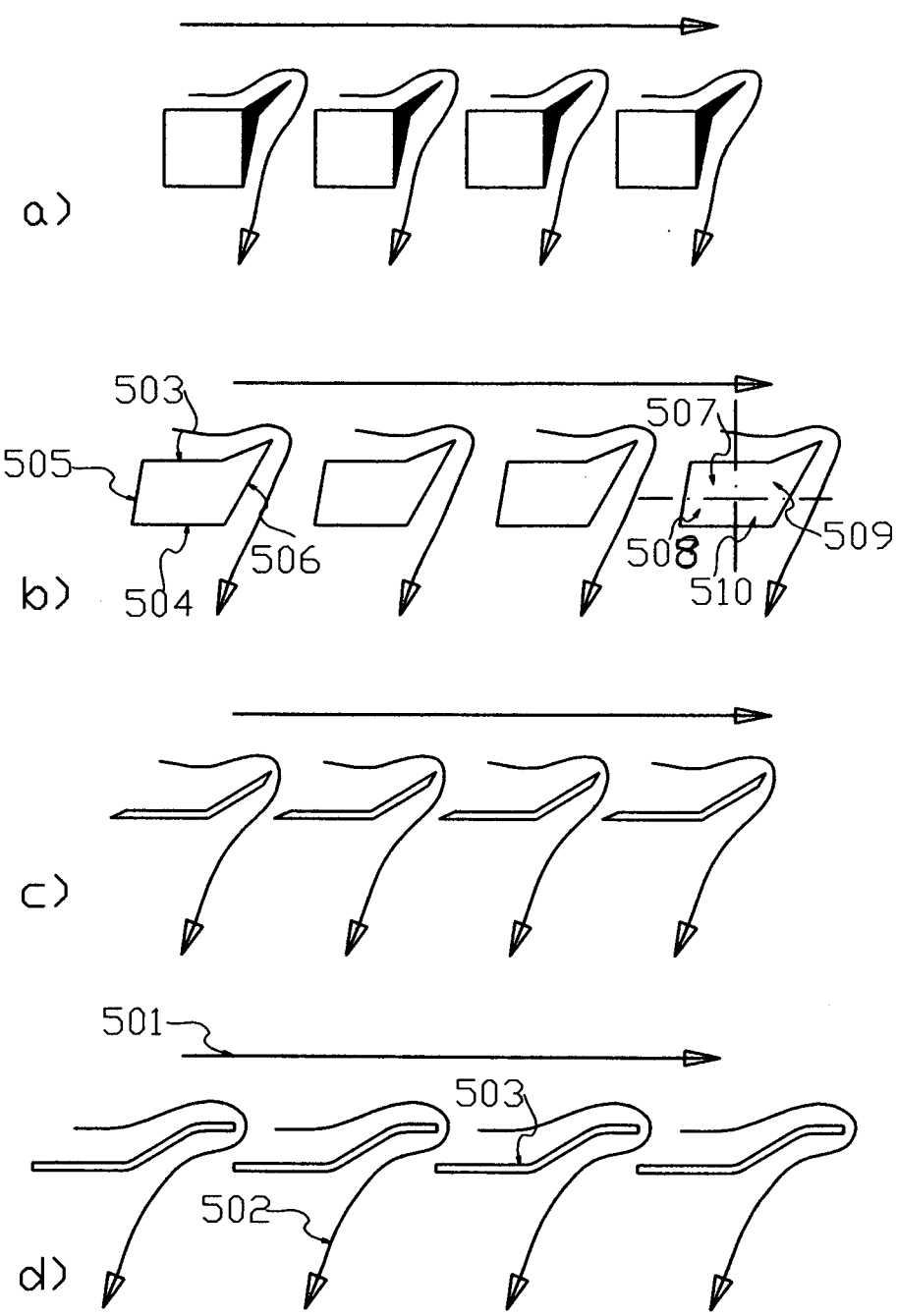
FIG. 5 depicts four of multitude of possible profiles of the sweeping flow separator screen. The linear grid of screen elements creates sharply curved streamlines required for inertial separation of particles that are swept across the internal surface of the screen. The flow of clean fluid with curved streamlines passes through the gaps of the separator screen.

FIG. 5 depicts four of multitude of possible profile geometries of the linear grid elements of the sweeping flow separator screen. The primary common objective and unique property of the grid element geometry is creation of sharply curved streamlines of the flow 502 passing through the gaps between the elements. In general: smaller the radius of the curvature of the streamline is, the smaller the size of the particle that will be separated from the pass-through flow and will remain on the face or concentrated side of the separator-screen. The secondary common objective and unique property of the grid element geometry is creation of least obstructed-low drag-flow conditions for the sweeping flow on the face side 503 of the screen. The separated particles remain on the swept side of the separator-screen and they must travel along the face of the screen with the seeping flow 501 with the least amount of resistance. In order to achieve these objectives all of the considered profiles must be asymmetrical with low-drag streamlined properties in direction of the sweep flow and must provide a highly curved streamlines for the flow passing through the gaps between the elements. For the purposes of this application the following nomenclature is applied to describe the orientations, directions and sides of the screen elements: The face side 503 is from where the mixed concentrated flow approaches the separator-screen. The clean side of the screen 504 is where the cleaned flow leaves the screen. Leading side 505 is facing the sweeping flow and trailing or after is side 506 where the sweeping flow leaves the profile. Consistent with this naming convention there are four quadrants of the profile: Leading-Face 507, Leading-Clean 508, Trailing-Face 509 and Trailing-Clean 510.

The geometry of the linear grid screen element depicted on FIG. 5a is a square profile with an attached, fastened, adhered, welded or otherwise secured lip or edge on the trailing-face quadrant of the element. The trailing edge is protruding into the sweeping flow on the face side of the separator-screen at an angle so the edge is leaning in the direction of the sweeping flow. FIG. 5b illustrates a complex wedge-like solid-bar profile of the linear grid screen element with the protruding edge on the trailing-face quadrant of the profile. The angle of the protrusion of the edge tilts the edge in direction of the sweeping flow such that it is streamlined for small drag against the sweeping flow. The sharp protruding edge (lip) facilitates the small curvature streamlines of the passing through flow. The profile of the linear elements of the separator screen depicted on FIG. 5c and FIG. 5d may be fabricated out of sheet metal or plate material. The profiles form a sharply curved path between two adjacent elements thereby enhancing particle separation from the pass-through flow. The shape of the profile is streamlined for the sweeping flow across the separator screen face. The protruding edge—on the profile depicted on FIG. 5d—has minimal resistance. The sizes and proportions of the linear screen elements and gaps may vary with the specific application. The approximate range of the gap-size may be from 0.2 mm to 100 mm. The gap-size is larger than the separated particle size. The approximate width size of the linear screen element may be from 0.8 mm to 250 mm.

Figure 6:
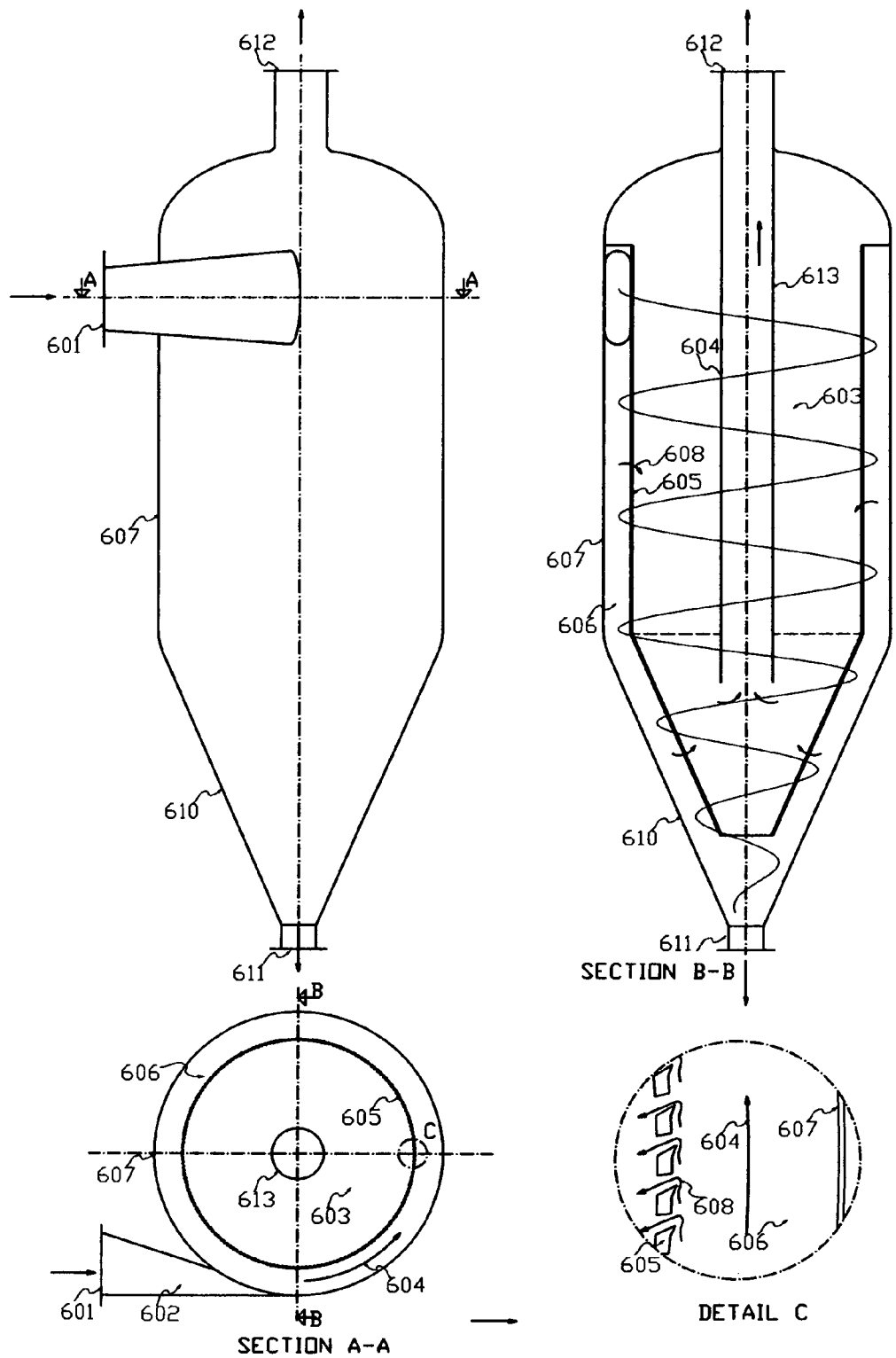
FIG. 6 depicts another embodiment of the cyclone induced sweeping flow separator. The direction of the flow through the separator screen is inward-radial from the perimeter to the center of the cyclone. The mixed fluid enters to the cyclone tangentially into the outer coaxial space and passes through the separator screen into the central collector space, while the separated particles are removed from the bottom of the outer space.

FIG. 6 shows cross sectional views and details of another preferred embodiment of the cyclone induced sweeping flow separator. The direction of the flow through the separator screen with this embodiment is the opposite of direction of the previously described embodiments. The direction of the flow-through is inward-radial that is from the perimeter toward the center of the cyclone. The mixed fluid enters the cyclone tangentially into the outer coaxial space and passes through the separator screen into the central collector space, while the separated particles are removed from the bottom of the outer space. The mixed flow of fluid (gas or liquid) and particles enters the apparatus through the inlet port 601 at the top portion of the device. The inlet nozzle 602 accelerates and directs the flow tangentially into the coaxial cylindrical sleeve-like space 606 between the separator screen 605 and the outer wall of the cyclone 607. This tangential entry generates a spinning, rotating, swirling motion of the fluid 604 that is also referred as cyclone effect. The rotating fluid sweeps the outer face of the cylindrical separator, perpendicularly crossing its linear grid elements 605. As the fluid circulates around the separator screen, the fluid will gradually pass through the gaps of the separator, with sharply curved streamlines 608 around the edges of the grid elements 605. The inertia of the particles in the mixed fluid will separate them from the curved streamlines of the fluid 608 passing through the separator and they will remain outside of the separator screen—despite the fact that the particles are smaller than the openings of the screen—and are swept along the rotating cyclone flow 604. The sweeping cyclone flow and the gravity will carry the particles to the bottom portion of the device. The particles will collect in the bottom, cone shaped space 610 and are removed through the outlet port 611. The separated fluid passes through the separator and it enters in the clean-fluid collector space 603 located in the center of the device. The clean fluid will be collected through a collector tube or pipe 613 located in the center line of the apparatus and exits the apparatus through port 612. The efficiency of the conventional cyclone is significantly improved by the inertial separator screen because the sharply curved, small-scale streamlines formed around the elements and the gaps enhance the particle separation.

Figure 7:
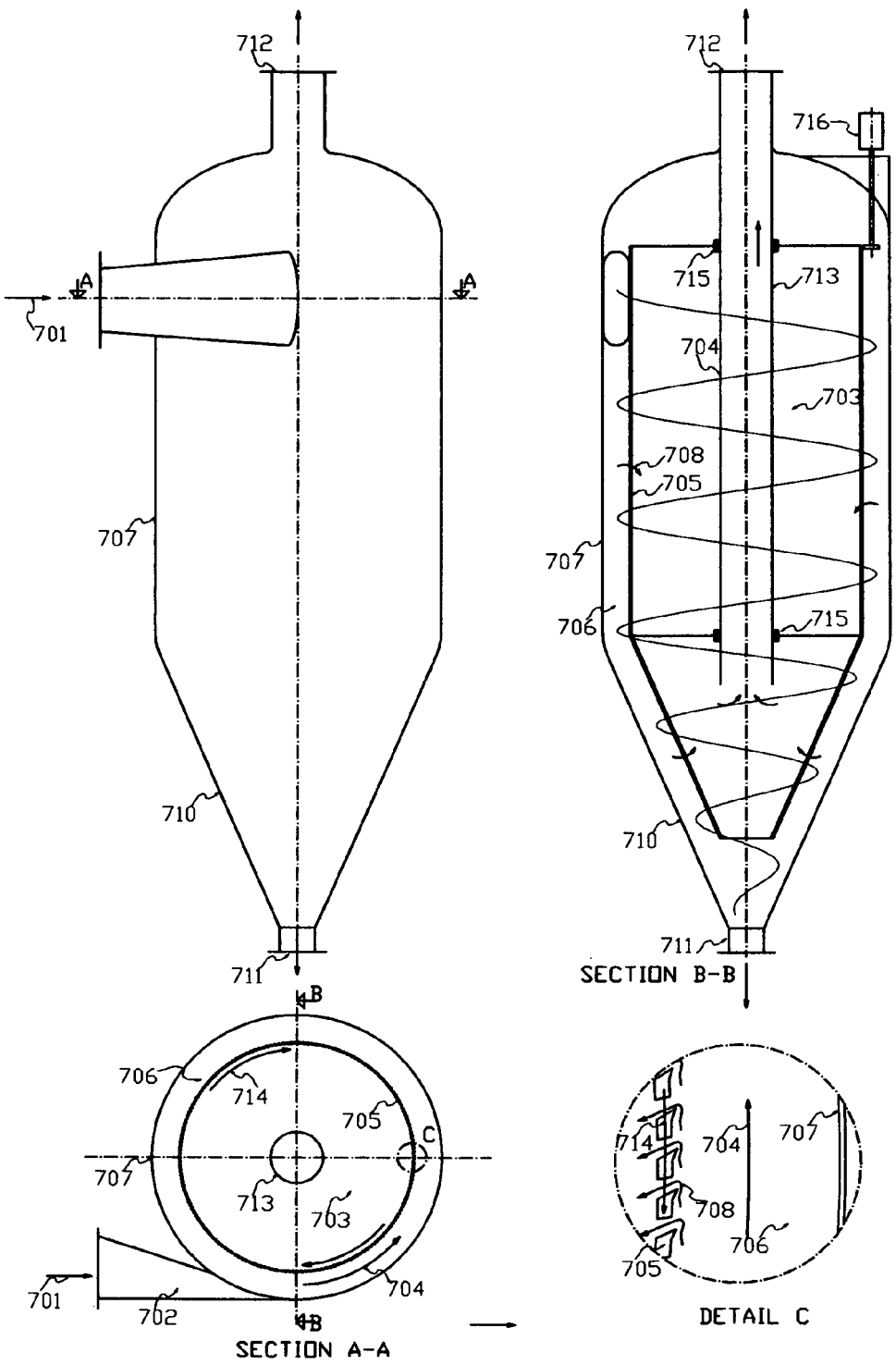
FIG. 7 depicts another embodiment of the cyclone induced sweeping flow separator. The rotational separator screen is rotating in counter direction of the tangentially entered inlet flow of fluid mixed with particles. The flow through the separator screen is inward-radial from the perimeter to the center of the cyclone. The mixed fluid enters to the cyclone tangentially into the outer coaxial space and passes through the separator screen into the central collector space, while the separated particles are removed from the bottom of the outer space.

FIG. 7 shows cross sectional views and details of another preferred embodiment of the sweeping flow separator. This embodiment is different than the previously described ones in that the inertial separator screen is not stationary. The cylindrical/conical separator screen is turning around it longitudinal axis thereby providing a rotational motion to the separation elements and gaps. The direction of its rotation is opposite to the direction of the rotating cyclone flow, thus enhancing the particle separation efficiency of the system. The mixed fluid 701 enters the cyclone tangentially into the outer coaxial space 704 and passes through the separator screen into the central collector space, while the separated particles are removed from the bottom of the outer space 703. The mixed flow of fluid (gas or liquid) and particles enters the apparatus through the inlet port 701 at the top portion of the device. The inlet nozzle 702 accelerates and directs the flow tangentially into the coaxial cylindrical sleeve-like space 706 between the separator screen 705 and the outer wall of the cyclone 707. This tangential entry generates a spinning, rotating, swirling motion of the fluid 704. The separator screen is mounted on bearings 715 and driven through a drive mechanism 716. The direction of the rotation of the screen 714 is the opposite to the rotational direction of the fluid 704. The rotating fluid sweeps the outer face of the rotating cylindrical separator at an increased sweeping speed as the tangential velocity of the rotating fluid is superimposed (added) to the tangential speed of the screen. The increased sweeping velocity enhances the acceleration of the fluid as it is perpendicularly crossing its linear grid elements 705 through the gaps. This enhanced acceleration improves the separation efficiency of the particles forcing them to remain in the coaxial space 706. As the fluid circulates around the separator screen, the fluid will gradually pass through the gaps of the separator, with sharply curved streamlines 708 around the edges of the grid elements 705. The inertia of the particles in the mixed fluid will separate them from the curved streamlines of the fluid 708 passing through the separator and they will remain outside of the separator screen. The sweeping cyclone flow and the gravity will carry the particles to the bottom portion of the device. The particles will collect in the bottom, cone shaped space 710, and are removed through the outlet port 711. The separated fluid passes through the separator and it enters in the clean-fluid collector space 703 located in the center of the device. The clean fluid will be collected through a collector tube or pipe 713 located in the center line of the apparatus and exits the apparatus through port 712. The efficiency of the conventional cyclone is significantly improved by the inertial separator screen because the sharply curved, small-scale streamlines formed around the elements and the gaps enhance the particle separation.

I claim:

1. A particle separator screen based on a cyclone induced sweeping flow, comprising:
    a cyclone separation vessel consisting of an inlet port with a converging nozzle in an upper part of a vertical cylindrical vessel, a cylindrical separation area, a conical collector cone with a particulate outlet port at the bottom of the separation vessel, and an outlet port at the top of the separation vessel;
    a separator screen comprising of a plurality of parallel, grid-like evenly spaced and asymmetrically profiled, linear screen elements arranged in a parallel with the axis of the cyclone's cylindrical separation area and conical collector cone of the cyclone separation vessel;
    wherein the linear screen elements comprised an asymmetrically profiled wedge bar screen comprised of a plurality of wedge bars used for sweeping flow assisted inertial separation of suspended particles in a fluid, wherein the profile of the wedge bars is a generalized trapezoid, tilted in the direction of the sweeping flow with a distinctly extended trailing edge at the aft face side of the cross section of the wedge bars which is immediately followed with a smooth, plane or curved, side wall with no protrusion into a gap between two adjacent wedge bars and wherein the trailing edge is protruding with a pointed edge into a tangential flow-pattern of the fluid and wherein the trailing edge induces a flow separation and creates localized eddies on the suction side of the trailing edge that shape highly curved fluid streamlines and thus creates the centrifugal forces required for inertial separation and wherein the gap is larger than the size of the particle separated from fluid;
    wherein the separator screen is coaxially mounted inside of the cyclone separation vessel and the inlet port converging nozzle is extended into the separator screen such that the gap between two adjacent linear elements of screen provides for a fluid mixed with particles entering the separator screen tangentially through the inlet port to flow through the separator screen.

2. The particle separator screen of claim 1 wherein the flow of fluid mixed with particles enters tangentially at the top end of the cylindrical separation area through a high velocity stream, creating a rotating flow inside the separator screen on a helical-downward path also known as cyclone effect, wherein the rotating fluid, mixed with particles sweeps across the inner side of the separator-screen, flowing approximately perpendicularly over the linear screen elements.

3. The particle separator screen of claim 1 wherein part of the rotating mixed fluid with particles inside the cylindrical separation area of the separator screen will pass through the gaps between each two adjacent screen elements to a cylindrical outer sleeve (306) that is approximately coaxial with the separator screen, wherein the streamlines of the fluid passing through the gaps of the screen have sharp, small-radius curvatures, thereby creating the acceleration conditions required for inertial separation of particulates, wherein the particulates separate from the streamlines of the pass-through flow continue on a helical downward path inside the separator screen and wherein the helical downward flow sweeps further the particles along the bottom conical collector cone portion of the separator screen for final removal from the cyclone separation vessel particulate outlet port.

4. The particle separator screen of claim 1 wherein the fluid that is passed through the gaps between each two separator screen elements and is cleaned from particles, is collected in a cylindrical outlet sleeve and leaves the cyclone separation vessel through the outlet port located at the top center of the cyclone separation vessel.

5. The particle separator screen of claim 1 wherein the linear screen elements may be wires, narrow strips, ribbons or other similar linear elements.

6. The particle separator screen of claim 1 wherein the particle separator screen may be entirely conically shaped.

* * * * *